(12) United States Patent
Perez Hernandez et al.

(10) Patent No.: US 8,718,041 B2
(45) Date of Patent: May 6, 2014

(54) LINE TERMINATION ARRANGEMENT WITH COMBINED BROADBAND AND NARROWBAND SERVICES

(75) Inventors: Maria Del Mar Perez Hernandez, Madrid (ES); Victor Manuel Diaz Diaz, Madrid (ES); Daniel Deloddere, Kruibeke (BE)

(73) Assignee: Alcatel Lucent, Paris (FR)

(*) Notice: Subject to any disclaimer, the term of this patent is extended or adjusted under 35 U.S.C. 154(b) by 1420 days.

(21) Appl. No.: 12/093,205

(22) PCT Filed: Nov. 10, 2006

(86) PCT No.: PCT/EP2006/068365
§ 371 (c)(1),
(2), (4) Date: Dec. 23, 2008

(87) PCT Pub. No.: WO2007/054569
PCT Pub. Date: May 18, 2007

(65) Prior Publication Data
US 2009/0135808 A1    May 28, 2009

(30) Foreign Application Priority Data

Nov. 10, 2005  (EP) ..................................... 05300911
Feb. 14, 2006  (EP) ..................................... 06300137

(51) Int. Cl.
*H04L 12/66* (2006.01)

(52) U.S. Cl.
USPC .......................................... 370/352; 370/248

(58) Field of Classification Search
USPC ............ 370/248, 352; 379/429, 90.01, 29.01; 333/101; 327/407; 361/119
See application file for complete search history.

(56) References Cited

U.S. PATENT DOCUMENTS

| | | | |
|---|---|---|---|
| 6,259,676 B1 * | 7/2001 | Kellock et al. | 370/248 |
| 6,434,221 B1 | 8/2002 | Chong | |
| 7,005,940 B2 * | 2/2006 | Kodim | 333/101 |
| 7,145,990 B2 * | 12/2006 | Goodman | 379/90.01 |
| 7,804,940 B2 * | 9/2010 | Huang et al. | 379/29.01 |
| 2004/0086110 A1 * | 5/2004 | Singaliese et al. | 379/429 |
| 2004/0861110 | 5/2004 | Singaliese | |
| 2005/0231882 A1 * | 10/2005 | Schmitt et al. | 361/119 |
| 2007/0132501 A1 * | 6/2007 | Koch et al. | 327/407 |

FOREIGN PATENT DOCUMENTS

WO    2005006656 A1    1/2005

* cited by examiner

*Primary Examiner* — Asad Nawaz
*Assistant Examiner* — Parth Patel
(74) *Attorney, Agent, or Firm* — Wolff & Samson, PC

(57) ABSTRACT

A combined line termination arrangement (1) for an access system supporting broadband transmission mode and narrowband transmission mode, the combined line termination arrangement (1) comprising a common interface device (4) having a common port (6) for receiving or transmitting a signal in said transmission modes and being connected to a first line termination (LT1) and a second line termination (LT2). The common interface device further comprises switching means (11, 14, 15, 18) for selectively connecting, by switching combinations, the first line termination (LT1), the second line termination (LT2) and auxiliary sources of broadband or narrowband transmission modes.

18 Claims, 5 Drawing Sheets

LINE TERMINATION ARRANGEMENT WITH COMBINED BROADBAND AND NARROWBAND SERVICES

The present invention relates to a line termination arrangement, typically hosted in an access system of a communications network, that is capable of providing simultaneous broadband and narrowband access to end users in a combined manner.

In general terms, broadband is a type of communication capable of providing multiple channels over a single communications medium, typically using some form of frequency or wave division multiplexing at a rate at or above 128 Kbit/s; whereas narrowband is related to communication at a rate lower than 128 Kbit/s, for example at or below 64 Kbit/s.

Typical examples of broadband communication are the various modalities of the so-called digital subscriber line (DSL) communications. These modalities are distinguished from each other by different protocols they use for transmission such as ADSL (asymmetric DSL), HDSL (High rate DSL) VDSL (very high rate DSL) or SDSL (symmetric DSL). In general, all the various DSL transmission protocols are referred to as xDSL.

A typical example of narrowband communication is the communication of voice using the conventional telephony systems such the so-called plain old telephone service (POTS).

BACKGROUND OF THE INVENTION

As it is well known, in the present telecommunications environments, the demand is increasingly pointing toward the provision of greater bandwidth capacity. In the future waves of broadband deployment, service providers are likely to focus on offering a set, as complete as possible, of services in the various domains of voice, data and video to the very household of the end users. These services comprise, for example, video on demand (VoD), HDTV and broadcast TV services for all subscribers simultaneously. In order to achieve this goal broadband access capability is required on the same conventional network implemented for narrowband applications. This means that transmission is made at the broadband and the narrowband rates simultaneously each rate being used for a particular application, e.g. broadband for data communication and narrowband for voice communication.

The simultaneous transmission of broadband and narrowband brings about the need for combining the two types of signal into one in transmission and separating (splitting) the two types of signal into two independent signals at reception.

In the conventional practice, the task of combining and splitting the broadband and the narrowband signals is done by means of the so-called "splitters". A splitter is therefore a device used in telephony in order to split a telephone signal into two or more signals of different frequencies, or combine signals of different frequencies to form a single combined signal. Splitters are typically installed at central offices and may be needed at customer premises.

One drawback associated with the use of splitters is the wiring work involved in providing a subscriber to a new service is complicated and time consuming. Whenever a new service is activated, for example for providing xDSL service to a user who is already connected to POTS services, the subscriber loop needs to be rewired. This in turn, requires that a technician visits the respective service delivery site, for example a central office or a cabinet, in order to perform the rewiring tasks. The consequence is an increase in costs for providing the new service mainly due to manpower expenses, and perhaps loss of revenue as the service would become available after certain delay, namely only after the completion of the rewiring work.

In order to overcome the above drawbacks solutions have been proposed in order to simplify the use of splitters. One such solution comprises the use of combination line termination cards (hereinafter referred to as "combination cards"). These cards are adapted for combining broadband and narrowband transmissions without using external splitters. These units are single cards that handle both the narrowband access and the broadband access. In order to separate the high rate and the low rate signals from each other, without using an external splitter, combination cards use low pass and high pass filters incorporated inside them.

However, the combination cards also present important drawbacks. These drawbacks can be described within three basic categories:

i—the rigidity of the solution in terms of future evolution;
ii—the upfront investment required for their installation; and
iii—the impact on narrowband service availability caused by a failure in the broadband service.

These drawbacks are described in further details below:

i—As regards the rigidity of the solution, it is a well known fact in the related art that in a combination card, both the broadband electronics and the narrowband electronics are present in the same physical unit. While narrowband telephony is a very stable technology due to the fact that the existing networks and services need no—or very little—change for their continuing availability, and the operators tend to want to make their investment in such technology last as long as possible (dozens of years or even more); the broadband access technology is changing very rapidly. Furthermore, it is a well known fact that broadband access technology will very probably change significantly every 2-3 years. This strong tendency for change together with the overwhelming demand from the end users for new services, force the operators to replace the already installed plants relatively frequently in their effort to keep up with the fast-changing demand and be compliant with the requirements of the new systems to be installed.

Therefore, when broadband transmission/reception circuitry is combined in the same physical unit with narrowband transmission/reception circuitry, replacing the broadband part implies also replacing the narrowband part. As a consequence the related narrowband hardware that was intended for lasting many years is discarded, thus giving rise to an unnecessary loss in investment and installation costs.

ii—As regards upfront investment, it is known that the intended advantage of combination card solutions is that the operating expenditures would be reduced when a service is activated to a given user. However, with the integrated combination card solutions the investment already includes both broadband and narrowband hardware technologies from the outset, regardless of whether there would be an eventual need of both services. Thus if the user in question does not demand the combined service, the presence of both types of hardware in the unit gives rise to unnecessary expenditure.

iii—As regards service availability, it is well known that the narrowband telephony is regarded as a high availability service. A level of availability of about 99.999% is a common rate in the related industry. Broadband, on the other hand, has less stringent requirements. If in an integrated combination card the broadband part suffers a failure, the whole card needs to be replaced, thus resulting in the unavailability of the narrowband telephony service as well. The contrary would also be a drawback, namely any failure in the narrowband system, although less probable, would eventually impact the broadband service upon replacement of the single unit combination card.

In view of the above drawbacks, a solution has been proposed by the applicant as subject-matter of a separate European patent application number 05300911.4 filed on 10 Nov. 2005 according to which two separate line cards, one for narrowband line termination and one for broadband line termination are used, the two line cards being coupled to a common interface device by means of separate connections. The common interface device is adapted for combining the two services, i.e. broadband and narrowband, into one single line, for example one single twisted-pair line from an access multiplexer to a main distribution frame. The common interface device is further designed in a way that allows for independent operation of the two line cards, while at the same time supports the so-called "soft provisioning" concept, namely the ability of switching on and off either one of the above-mentioned services without requiring rewiring work on the subscriber loop. The combination of narrowband and broadband functionalities provides the network operator with ability of activating and deactivating when required, any service on any subscriber line with a simple network management operation.

Moreover, the common interface device comprises auxiliary switching arrangements which can serve as a flexibility point in the system thus allowing the incorporation of additional components or equipment, without major rework on the original system.

A description of said solution is reproduced hereinbelow with reference to FIGS. 1 and 2.

FIG. 1 shows a simplified schematic example of a block diagram of a combined multiservice line termination arrangement 1 according to a first embodiment of the above-mentioned solution contained in European patent application number 05300911.4 for use in an access system. The combined line termination arrangement 1 comprises a first line termination LT1 having a first line card 2 adapted for transmitting and receiving signals in broadband transmission mode, and a second line termination LT2 having a second line card 3 adapted for transmitting and receiving signals in narrowband transmission mode. For example, the first (broadband) line termination LT1 may be adapted for supporting xDSL communication. The corresponding first (broadband) line card 2 may comprise an xDSL baseband circuit for providing connectivity with an xDSL modem as well as a high pass filter 8; and the second (narrowband) line termination LT2 may be adapted for supporting voice telephony, for example a POTS system. The corresponding second (narrowband) line card 3 may comprise a voice codec circuit in order to perform the necessary digital to analog conversion, or vice-versa, in order to adapt the signal for the POTS system, as well as interface circuitry.

The combined line termination arrangement 1 further comprises a common interface device 4 which is coupled, through separate coupling paths, to the first line termination LT1 and second line termination LT2. The common interface device 4 is further connected, through the common port 6 to the main subscriber line 5, for example through intermediate connection from the common interface device 4 to a main distribution frame 7 and from the latter to the main subscriber line 5.

The common interface device 4 comprises a low pass filter 9 and a first switching means 10, such as for example a relay or equivalent, for providing switching combinations as will be described in further detail below.

The low pass filter 9, as its name indicates, is adapted for allowing the passage of relatively low frequencies and for blocking frequencies which are in higher ranges. Typical values for the low frequencies are frequencies below 8 KHz.

Line termination LT1 further comprises a high pass filter 8 in order to block the low frequency signals. Thus the high pass filter 8 may be selected to block frequencies below 8 KHz.

Both filters 8 and 9 are bi-directional, namely they are capable of performing filtering operation in one direction of transmission or the other.

In order to provide additional flexibility points in signal routing, switching means is provided in the common interface device 4. As shown in FIG. 1, a first switching means 10 is placed in an interconnecting position with respect to the common port 6, first line termination LT1 and second line termination LT2, through low pass filter 9.

When the first switching means 10 is placed in position A, the common port 6 is directly connected to the first line termination LT1 through the coupling path A1 and is further connected by means of the coupling path A2 to the second line termination LT2 through the low pass filter 9.

In transmission, line termination 1, having the line card 2 transmits broadband signals to the common interface device 4 through the high pass filter 8. As the broadband signals are of high frequencies, the high pass filter allows a substantially complete passage of the signal through, which is then output from the common port 6. Low pass filter 9 blocks the passage of the broadband signal towards the line termination LT2.

On the other hand, the line termination LT2 transmits narrowband signals to the common interface device 4. These signals pass through the low pass filter 9 which allows a substantially complete passage of the narrowband signal which is then output at the common port 6. High pass filter 8 blocks the passage of the narrowband signal towards the line termination LT1.

In reception, a combined narrowband and broadband signal input at common port 6 in directed, through the coupling path A1, towards the first lines termination LT1 where the low frequency part of the combined signal is blocked at the high pass filter 8 and the high frequency signal is allowed to pass towards the broadband line card 2. The combined signal input at common port 6 also is fed, through the coupling path A2, to the low pass filter 9 which blocks the high frequency signals and allows the passage of the low frequency signals towards the second line termination LT2 and thus towards the narrowband line card 3.

Therefore in this arrangement both the broadband and narrowband transmission and receptions modes are available.

However, situations may arise where the broadband service provided by the first line termination LT1 needs to be interrupted, for example because the existing broadband service needs to be replaced by a service based on a newly developed broadband technology; or where there is a need to provide connectivity with an external broadband equipment to the subscriber line, while maintaining unchanged the narrowband service provision from the line termination LT2.

In such cases, the switching means 10 may be placed in position B, where the first line card LT1 is disconnected from the common port 6 and the common interface device 4 only operates with narrowband services through the coupling path B1. In this arrangement also, the low pass filter 9 serves for blocking any incoming high frequency signal while the broadband service is delivered or received from an external system (not shown).

FIG. 2 shows a further embodiment of the solution proposed in the above-mentioned European patent application number 05300911.4 wherein a second switching means 11 is used. In this figure, features similar to those of FIG. 1 are given the same reference numerals.

An example of a situation where a second switching means may be necessary is where there is a need to provide a smooth migration from old equipment (e.g. local exchanges) to the new equipment. In such a case, it may be assumed that the old local exchange subscriber line is connected to connection port 12 of the common interface device 4 through connection point C of the second switching means 11. Broadband service from the first line termination LT1 is activated or deactivated, based on the specific requirements of each application, by changing the position of switching means 10 as previously described in relation to FIG. 1.

Therefore, in case it is desired to perform a full migration operation from an old local exchange to a new equipment, for example in order to decommission the old local exchange, the operation can be performed by a simple change in the position of the second switching means 11 from position C to position D without a need to visit the respective site. In position D, connectivity is provided through connection port 13 towards the newly connected line termination LT2 provides narrowband service using the narrowband line card 3 as previously described in relation to FIG. 1.

While the subject-matter of the European patent application number 05300911.4 provides a solution for combining signals of different type for transmission and separating signals of different type combined in one into separate signals by using separate line cards that operate independently from each other, circumstances may occur where it may become necessary to provision arrangements for switching in or switching out equipment from the system according to specific requirements not mentioned detail in said European patent application. The equipment to be switched in or switched out may be related to broadband or narrowband services as the specific conditions of each case may require.

The present invention provides solution for such specific requirements as will be described in more detail below.

EXAMPLES OF PREFERRED EMBODIMENTS

Figure 3:
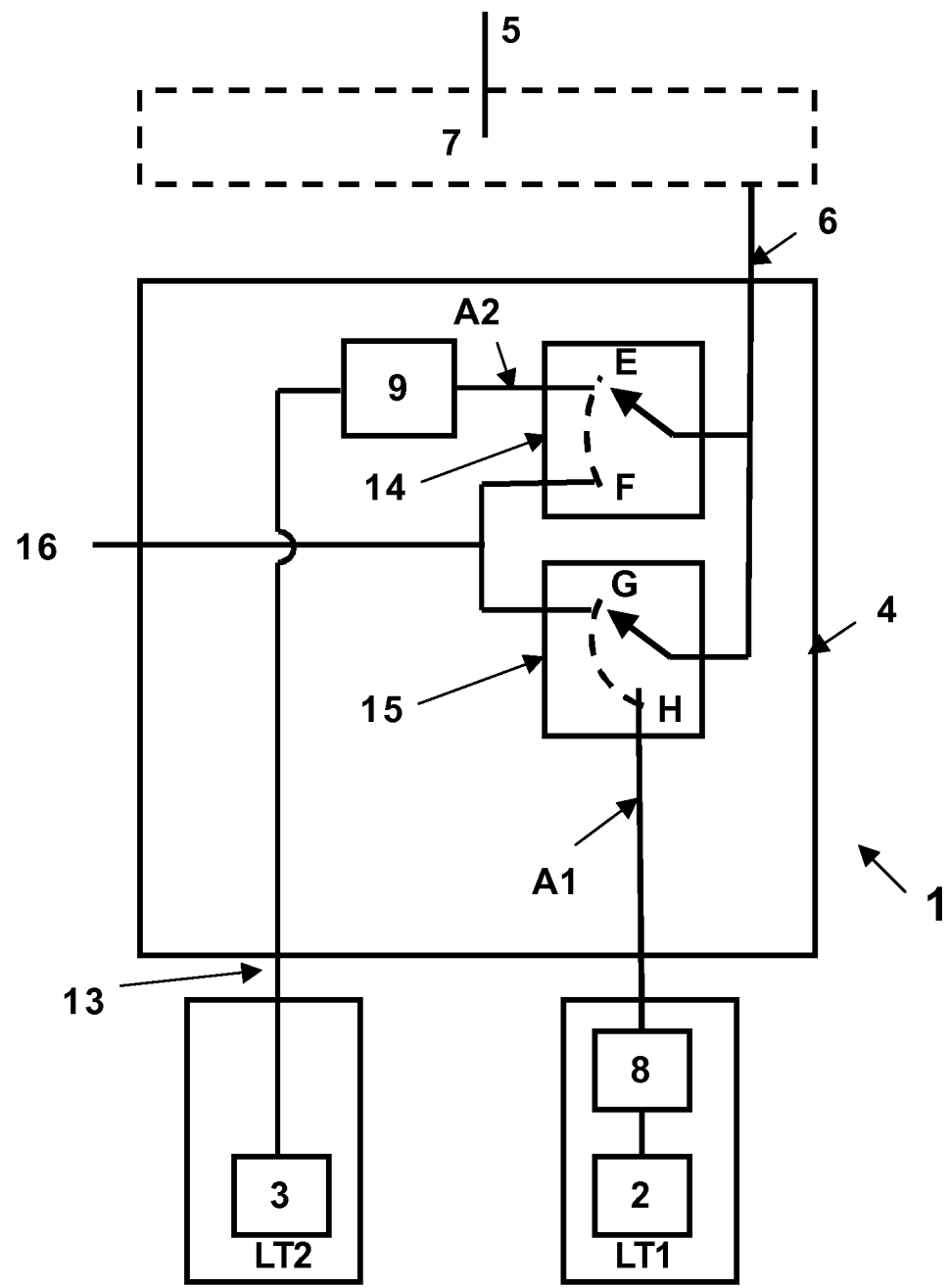
FIG. 3 is a schematic block diagram of a combined line termination arrangement according to a first embodiment of the present invention.

FIG. 3 shows a first embodiment of the present invention. In this figure, features similar to those of FIGS. 1 and/or 2 are given the same reference numerals. FIG. 3, however relates to an alternative use of a first switching means 14 and a second switching means 15 within the common interface device 4 of the line termination 1 as will be described below.

Figure 1:
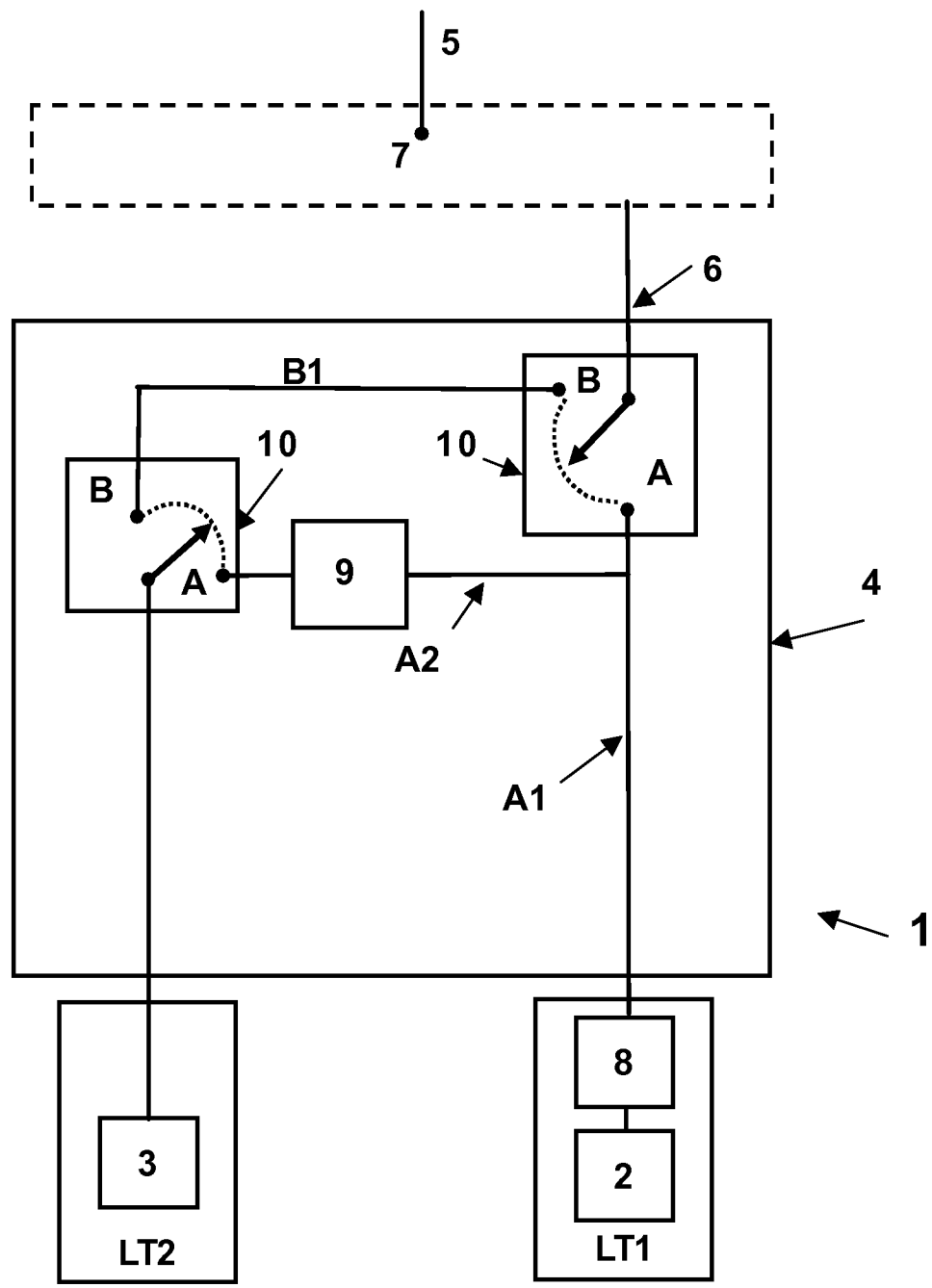
FIG. 1, as already discussed, is a schematic block diagram of a combined line termination arrangement according to a first embodiment of a prior art solution.

An example of a situation where this first embodiment of the present invention is used, is where there is a need to be able to maintain broadband service availability from an auxiliary equipment, in addition to the service provided from the first line termination LT1 (as discussed with reference to FIGS. 1 and 2). For example, in case of local loop unbundling, it may become necessary that while narrowband services are provided through the second line termination LT2 on a per common port basis, the broadband services can be selected either from the connectivity provided by the first line termination LT1 or from the auxiliary system as will be described further below, in either case combined with the narrowband services.

Such auxiliary service may be provided from an external system, for example an external xDSL source, or an additional line termination located inside the line termination arrangement 1. The auxiliary broadband source is coupled to the line termination 1 through an auxiliary port 16 of the common interface device 4 such that through this auxiliary port 16, it is connected to points F and G of the first and second switching means 14 and 15 respectively.

Thus in transmission, in the case that an auxiliary broadband service input at auxiliary port 16 is to be combined with the narrowband service provided through the second line termination LT2, the first switching means 14 is activated in position E and the second switching means 15 is activated in position G. In this configuration, the narrowband signals from the narrowband line card 3 are allowed to pass through connection port 13, low pass filter 9 and the coupling path A2; whereas the broadband signals arriving through port 16 are directed through the second switching means 15 at position G such that the two signals are mixed so as to form a combined narrowband and broadband signal which is then sent via the common port 6 to the main subscriber line 5.

At reception, due to the bi-directional characteristics of this embodiment, the operation is performed in an analog manner, namely, with the first and the second switches 14 and 15 being at positions E and G (as in transmission) a combined narrowband and broadband signal input at common port 6 is directed through the coupling path A2, to the low pass filter 9 which blocks the high frequency signals and allows the passage of the low frequency signals towards the second line termination LT2 and thus towards the narrowband line card 3; whereas the combined narrowband and broadband signal input at common port 6 is directed through the second switching means 15 at position G, towards the auxiliary broadband system through auxiliary port 16 (while the auxiliary broadband system is not shown in the figure for reasons of simplicity, it is understood that the auxiliary broadband system is also equipped with a high pass filter by which the low frequency part of the combined signal is blocked and the high frequency signal is allowed to pass towards the auxiliary broadband system).

In case it is needed to change the connection from the auxiliary broadband source to an internal broadband signal source for example through the first line termination LT1, the second switching means 15 is activated to change position from point G to point H so as to provide connectivity with the first line termination LT1. In this configuration, the broadband signal from the first line termination LT1 is coupled to the narrowband signal from to the second line termination LT2 and sent towards the common port 6.

Here again for reception, the operation of the common interface device 4 is similar by way of analogy, to that discussed above for transmission (although in reverse direction with respect to transmission).

One advantage of this embodiment is that in case migration from one broadband source to another one is needed, the migration procedure can be performed via soft provisioning, i.e. no need for an on-site visit or manual operation in order to execute the service switching operation, either for externally provided broadband service, or for internally provided broadband service.

Another advantage of the first embodiment of the present invention is its capability in simplifying still further a migration from an existing narrowband exchange working in combination with and externally provided broadband services towards a combined narrowband and broadband service provided by the line termination arrangement 1 of the present invention. In this regard an additional function provided by the first switching means 14 is the function of "roll-back" or "loop-through" according to which prior to changing over from central office narrowband & broadband services to a new equipment comprising a line termination arrangement according to the present invention, it may be preferable to first install the new equipment, without directly activating its narrowband & broadband services for all lines at once. This would mean that at certain times, some lines are connected and some others are not connected. The advantage of this solution is that when an operator installs such an equipment for example in a street cabinet, preferably first the infrastructure parts are installed (e.g. fiber, cabinet, shelf with all line cards for narrowband and broadband modes, main distribution frame wiring etc.), now in an initial phase, the narrowband and broadband services may still be provided from the central office (cut-through situation), whereby tests may be performed to make sure that all cables and connections are correctly wired and service is available and continuing. Then at a desired migration moment, the subscribers, either all or only the subscribers which have new services in the cabinet may be connected at once (so-called "cut over") this may be case, for example for VDSL services, while for example ADSL services still coming from the central office. In case a failure is detected, it is still possible to revert back to the previous situation.

Another use of this scenario is when there is line test equipment in the central office, in which case a subscriber may be "cut-through" in order to measure that line.

In this case, first and second switching means 14 and 15 are set into the positions F and G respectively, in order to ensure provision of service from an exchange (not shown) coupled to auxiliary port 16. Subsequently, services can be switched in using the line termination arrangement 1 under soft provisioning control.

In addition if required, at any moment in time, service delivery can be reverted back to external service source via auxiliary port 16 which may be for narrowband and/or broadband services.

It is to be noted that a further combination of first switching means 14 and second switching means 15 is possible by positioning them at points F and H respectively. As a consequence only the auxiliary source is connected through auxiliary port 16 to common port 6. This combination may not be of any particular interest, nevertheless it is available in case any particular need arises.

Figure 2:
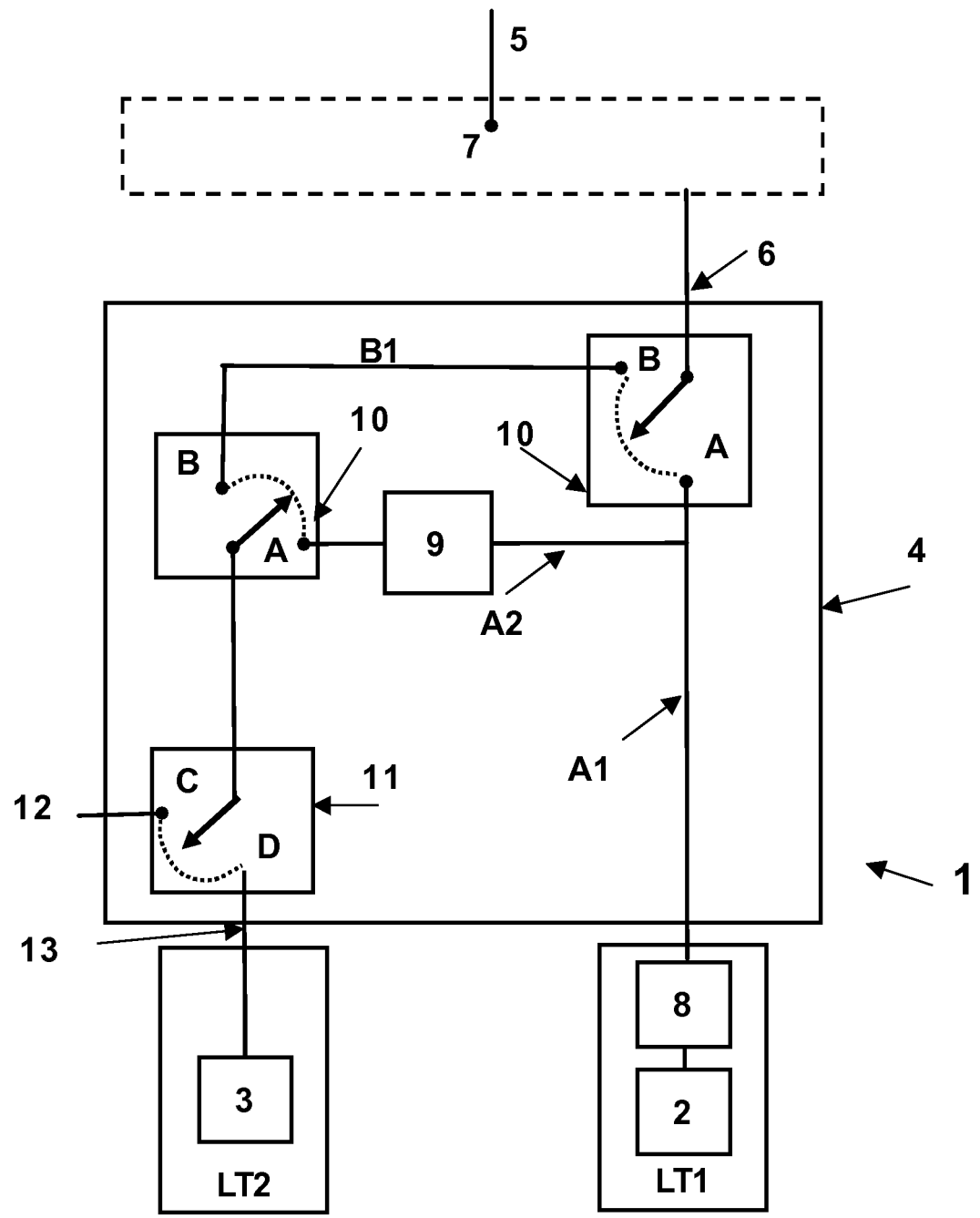
FIG. 2, as already discussed, is a schematic block diagram of a combined line termination arrangement according to a second embodiment of the prior art solution of FIG. 1.
Figure 4:
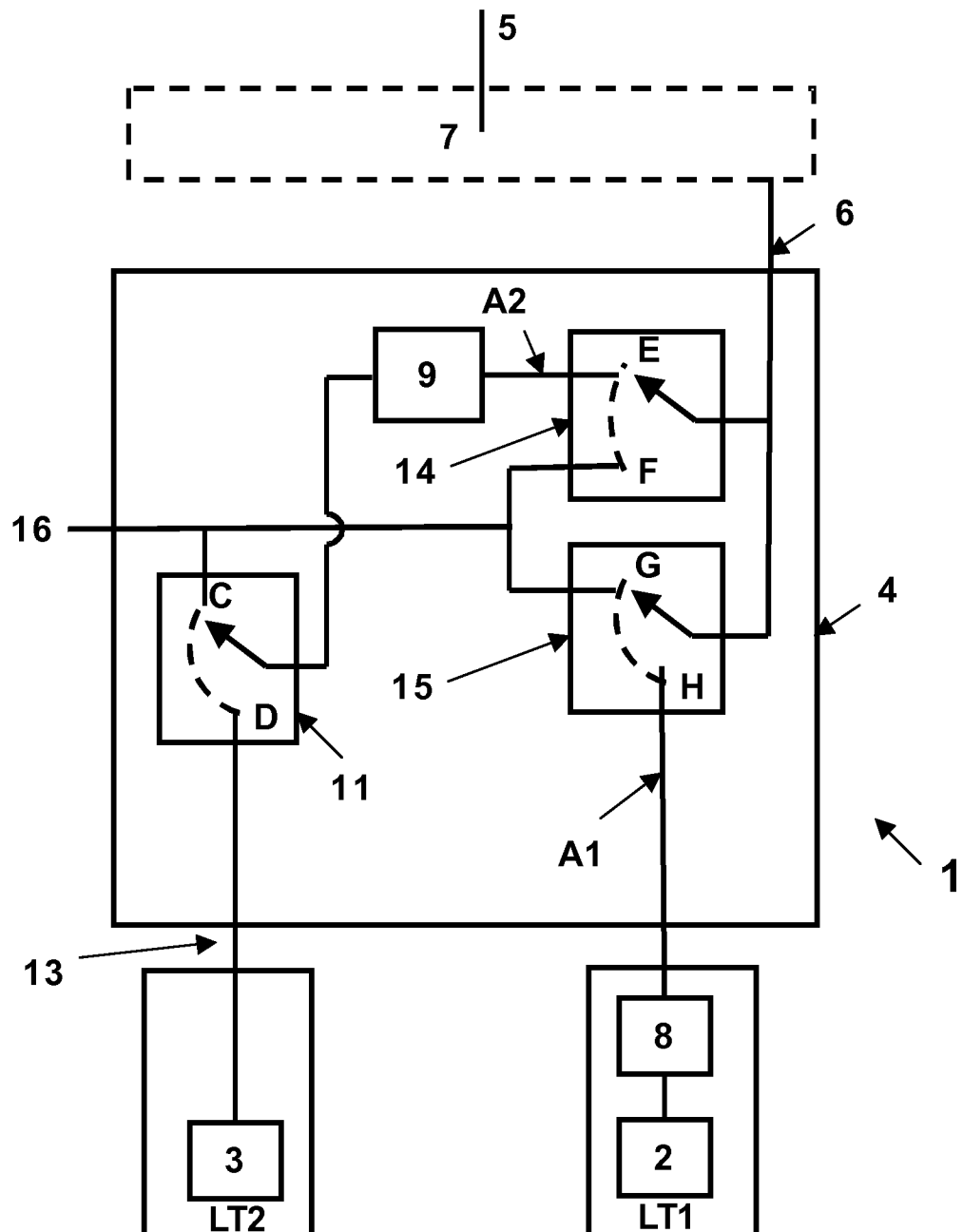
FIG. 4 is a schematic block diagram of a combined line termination arrangement according to a second embodiment of the present invention.

FIG. 4 shows a second embodiment of the present invention wherein the first switching means 14 and the second switching means 15 as described in FIG. 3, are combined with a third switching means 11 the function of which is similar to that described in relation to the switching means 11 in FIG. 2. In this figure, features similar to those of previous figures are given the same reference numerals.

An example of a situation where this embodiment of the present invention may be used, is where there is a need to provide a smooth migration from old equipment (e.g. Local exchanges) to new equipment, as described in relation to the line termination arrangement of FIG. 2, in combination with the service migration capabilities as described in relation to the first embodiment of the present invention (in relation to FIG. 3).

Thus while the first and second switching means 14 and 15 are capable of combing the use of a narrow band source (through the second line termination LT2) with either a choice of an internal broadband source (through the first line termination LT1) or a choice of an auxiliary broadband source (through auxiliary port 16), third switching means 11 provides an additional possibility of switching in and out an internal narrowband source (through second line termination LT2) or an auxiliary narrowband source (through auxiliary port 16, in which case, this port would only be connected to a narrowband source.

The arrangement of the second embodiment of the present invention may provide a plurality of possibilities of switching combinations which are described in detail below. It is to be understood that the choice of a particular combination may depend on the specific needs of each application and decided upon on a case by case basis.

Combination 1:
Switching means 14 in position E;
Switching means 15 in position H;
Switching means 11 in position D;
Result:
Narrowband service provided through line termination LT2;
Broadband service provided through line termination LT1.
Combination 2:
Switching means 14 in position E;
Switching means 15 in position G;
Switching means 11 in position D;
Result:
Narrowband service provided through line termination LT2;
Broadband service provided through auxiliary port 16.
Combination 3:
Switching means 14 in position E;
Switching means 15 in position G;
Switching means 11 in position C;
Result:
Narrowband service NOT provided through line termination LT2;
Auxiliary port 16 is connected through position C of switching means 11 and low pass filter 9 on the one hand, and through position G of switching means 15 on the other, to common port 6. In this manner a choice may be made in order to transmit broadband service through position G of switching means 15 while low pass filter 9 block the passage of the signal.
Combination 4:
Switching means 14 in position E;
Switching means 15 in position H;
Switching means 11 in position C;
Result:
Narrowband service NOT provided through line termination LT2;
Auxiliary port 16 is connected through position C of switching means 11 and low pass filter 9 to common port 6 where narrowband service may be provided thereby;
Broadband service provided through line termination LT1.
Combination 5:
Switching means 14 in position F;
Switching means 15 in position H;
Switching means 11 in position C;
Result:
Narrowband service NOT provided through line termination LT2;
Auxiliary port 16 is connected through position C of switching means 11 and low pass filter 9 to common port 6 where narrowband service may be provided thereby;
Broadband service provided through line termination LT1.
Combination 6:
Switching means 14 in position F;
Switching means 15 in position G;
Switching means 11 in position C;
Result:
Narrowband service NOT provided through line termination LT2 but may be provided through auxiliary port 16 as discussed in relation to combinations 4 or 5;
Broadband service NOT provided through line termination LT1 but may be provided (at choice) through auxiliary port 16.
In this case in is only auxiliary port 16 which is connected through various paths to common port 6, namely through position C of switching means 11 and low pass filter 9, through position G of switching means 15 and through position F of switching means 14 to common port 6.
Combination 7
Switching means 14 in position F
Switching means 15 in position G
Switching means 11 in position D
Result:
Narrowband service provided through line termination LT2
Broadband service NOT provided through line termination LT1 but may be provided through positions F (and G) of the first and second switching means respectively towards auxiliary port 16. This is a so-called "cut-through" situation.
Combination 8
Switching means 14 in position F
Switching means 15 in position H
Switching means 11 in position D
Result:
Narrowband service provided through line termination LT2
Broadband service provided through line termination LT1 but may also be provided (at choice) through auxiliary port 16.

It is to be noted that while all eight combinations are described above for the sake of completeness of description, in practice some of them may not be of specific use. In any event, at least combinations 1, 2, 4 and 7 are of practical use within the scope of the present invention.

In this embodiment for reception, the operation of the common interface device 4 is also similar by way of analogy, to that discussed above for transmission (although in reverse direction with respect to transmission).

Figure 5:
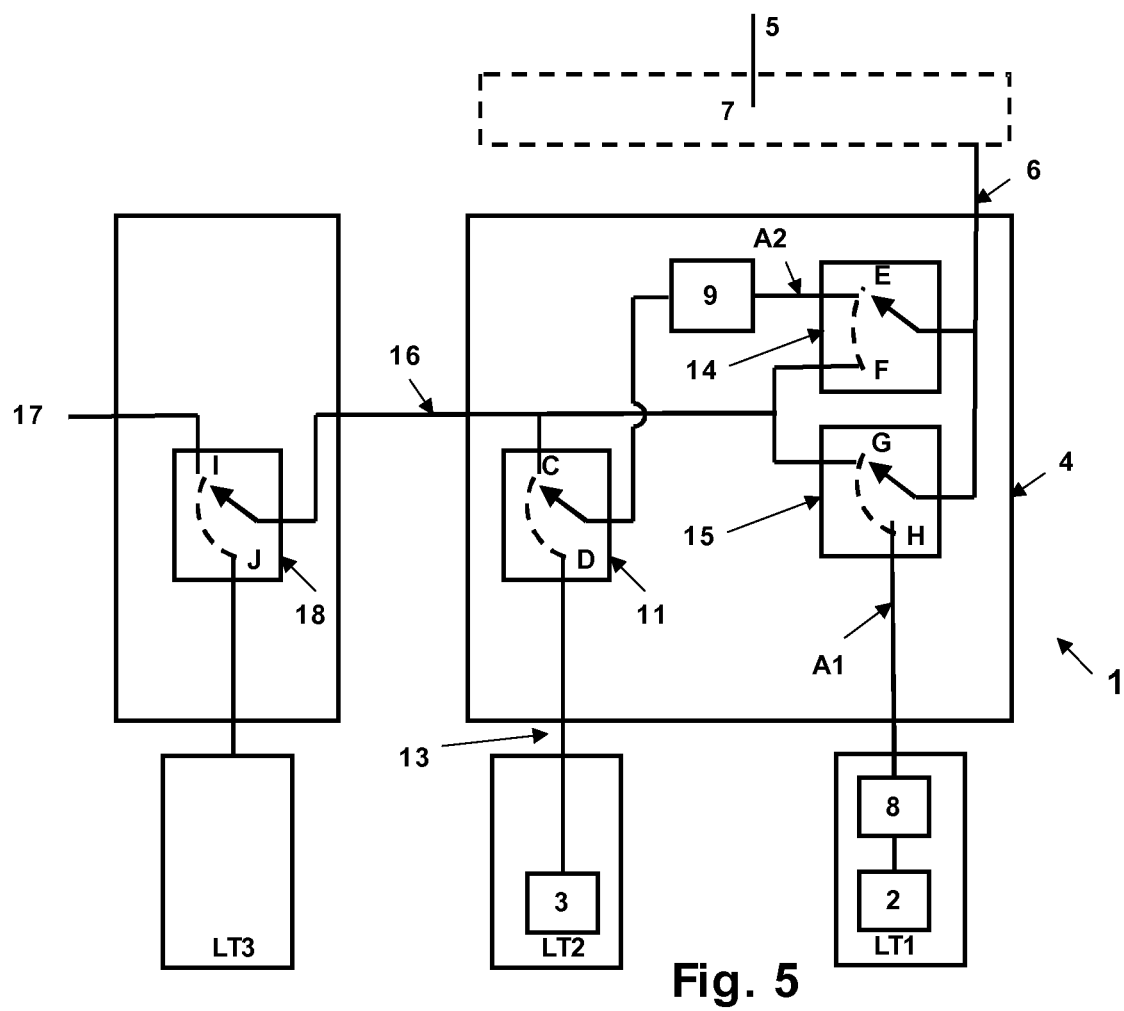
FIG. 5 is a schematic block diagram of a combined line termination arrangement according to a third embodiment of the present invention.

FIG. 5 shows a third embodiment of the present invention. The difference between this third embodiment and that of the second embodiment of the invention (as shown in FIG. 4) is in the use of a third (auxiliary) line termination LT3. This third line termination LT3 is connected to the common interface device 4 through auxiliary port 16 and may located either outside the line termination arrangement 1 or inside the same and may be used for providing broadband services or narrowband services according to specific needs of each application. As can be observed in the figure, the third line termination LT3 may be coupled to a forth switching means 18. In case the forth switching means 18 is in position I, the third line termination LT3 is isolated from the rest of the circuit and the situation is then identical as that of the second embodiment already discussed above.

In case the third line termination LT3 is chosen to provide narrowband service, the third switching means 11 may be used in order to select between narrowband services provided from second line termination LT2 or from third line termination LT3, provided that the forth switching means 18 is switched in position J. Broadband service may be provided by any convenient source such as for example through first line termination LT1. This situation may be required for example when the main subscriber line 5 is capable of providing POTS and xDSL services, or ISDN+xDSL services. In this manner, the combination of third switching means 11 and forth switching means 18 provides the possibility of selecting still a further external narrowband service source, for example from a local exchange, to be mixed with broadband (e.g. xDSL) service onto the main subscriber line 5.

In addition, third line termination LT3 may also be used for providing an alternative broadband service, whereby switching means 11 is positioned in position D, and first and second switching means 14 and 15 are positioned at positions E and G respectively. Switching means 18 then still has the possibility of switching between an external broadband service via port 17 (which has a similar function as port 16 discussed above), and an alternative internal broadband service provided at third line termination LT3.

In case the third line termination is used for broadband services, a corresponding high pass filter similar as the one used (as discussed above) for the first line termination LT1 is used in order to block narrowband signal and allowing the passage of broadband signals to and from the third line termination LT3. Furthermore, depending on whether broadband or narrowband services are provided through third line termination LT3, the latter is equipped with (not shown) corresponding broadband or narrowband line card respectively.

Here again for reception, the operation of the common interface device 4 in conjunction with the third line termination LT3 is similar by way of analogy, to that discussed above for transmission (although in reverse direction with respect to transmission).

It is to be noted that the first, second and third switching means 14, 15 and 11 respectively may be chosen from known switching means available such as for example a relay or equivalent.

The present invention provides important advantages, among which the following are noted:

Flexibility in the sense that network operators have the possibility of controlling their capital expenditure according to their needs. For example they can choose as to whether they prefer to opt for a complete investment upfront or they prefer to perform a "seeding" operation according to which one service (e.g. broadband) is deployed in the network initially, and at a later stage when the network planning or the demand so requires, the second service is deployed (e.g. narrowband in an exchange replacement scenario).

Evolution in the sense that if broadband access technology evolves and requires replacement of the installed base, the broadband line terminations can be replaced without disturbing the narrowband service.

Fault independence because the operation of the three line cards is independent of each other; therefore failure of one line card (broadband or narrowband) does not impact the service provided by the other one.

The invention claimed is:

1. A common interface device (4) for use in a combined line termination arrangement (1) for an access system, the system being adapted for supporting broadband transmission mode as well as narrowband transmission mode, the combined line termination arrangement (1) comprising a first line termination (LT1) with a high pass filter (8) and a second line termination (2), the first and second line terminations (LT1; LT2) being connectable to a first line card (2) for broadband transmission mode and a second line card (3) for narrowband transmission mode, the common interface device (4) comprising a common port (6) for receiving or transmitting a signal in one of said transmission mode or in a combination of said transmission modes and a low pass filter (9) disposed between the common port (6) and the second line termination (LT2), characterized in that the common interface device (4) further comprises:
    a first switching means (14) for switching between a first position (E) whereby the common port (6) is connectable to the second line termination (LT2) and a second switching position (F) whereby the common port (6) is connectable to an auxiliary port (16) for connection to an auxiliary source adapted for operating in broadband and/or narrowband transmission modes; and
    a second switching means (15) for switching between a first position whereby the common port (6) is connectable to the first line termination (LT1) and a second switching position whereby the common port (6) is connectable to an auxiliary port (16) for connection to an auxiliary source adapted for operating in broadband and/or narrowband transmission modes.

2. The common interface device according to claim 1, comprising a third switching means (11) for selectively connecting the first switching means (14) to the second line termination (LT2) or to the auxiliary port (16).

3. The common interface device, according to any one of the previous claims wherein the auxiliary port (16) is connected to a third line terminations (LT3) adapted for selectively operating in narrowband or broadband transmission mode.

4. The common interface device according to claim 3 wherein the third line terminations (LT3) is external to the common interface device.

5. The common interface device according to claim 3 wherein a fourth switching means (18) is disposed between the third line terminations (LT3) and the auxiliary port (16).

6. The common interface device according to claim 1, wherein said first position of said first switching means does not connect said common port to said first line termination.

7. The common interface device according to claim 1, wherein said first position of said second switching means does not connect said common port to said second line termination.

8. A combined line termination arrangement (1) for an access system, the system being adapted for supporting broadband transmission mode as well as narrowband transmission mode, the combined line termination arrangement (1) comprising a first line termination (LT1) with a high pass filter (8) and a second line termination (2), the first and second line terminations (LT1; LT2) being connectable to a first line card (2) for broadband transmission mode and a second line card (3) for narrowband transmission mode, a common interface device (4) comprising a common port (6) for receiving or transmitting a signal in one of said transmission mode or in a combination of said transmission modes and a low pass filter (9) disposed between the common port (6) and the second line termination (LT2), characterized in that the common interface device (4) further comprises:
    a first switching means (14) for switching between a first position (E) whereby the common port (6) is connectable to the second line termination (LT2) and a second switching position (F) whereby the common port (6) is connectable to an auxiliary port (16) for connection to an auxiliary source adapted for operating in broadband and/or narrowband transmission modes; and
    a second switching means (15) for switching between a first position whereby the common port (6) is connectable to the first line termination (LT1) and a second switching position whereby the common port (6) is connectable to an auxiliary port (16) for connection to an auxiliary source adapted for operating in broadband and/or narrowband transmission modes.

9. The combined line termination arrangement according to claim 8, wherein said first position of said first switching means does not connect said common port to said first line termination.

10. The combined line termination arrangement according to claim 8, wherein said first position of said second switching means does not connect said common port to said second line termination.

11. A method for separating and/or combining signals of different bandwidth in a combined line termination arrangement (1) for an access system, said combined line termination arrangement (1) comprises a first line termination (LT1) having a high pass filter for broadband transmission mode, a second line termination for narrowband transmission mode and common interface device (4) for receiving or transmitting, at a common port (6), a signal in one of said transmission modes or in a combination of said transmission modes, the common interface device comprising a low pass filter disposed between the common port (6) and the second line termination (LT2), characterized in that the method further comprises the steps of:
    switching of a first switching means (14) between a first position (E) whereby the common port (6) is connectable to the second line termination (LT2) and a second switching position (F) whereby the common port (6) is connectable to an auxiliary port (16) for connection to an auxiliary source for operating in broadband and/or narrowband transmission modes; and/or
    switching of a second switching means (15) between a first position whereby the common port (6) is connectable to the first line termination (LT1) and a second switching position whereby the common port (6) is connectable to an auxiliary port (16) for connection to an auxiliary source for operating in broadband and/or narrowband transmission modes.

12. The method according to claim 11 further comprising the step of selectively connecting, by means of a third switching means (11), the first switching means (14) to the second line termination (LT2) or to the auxiliary port (16).

13. The method according to claim 11, comprising the step of connecting the auxiliary port (16) to a third line terminations (LT3) for selectively operating in narrowband or broadband transmission mode.

14. The method according to claim 11, comprising the further step of switching, by means of a fourth switching means (18) the auxiliary port (16) to the third line terminations (LT3) or an additional port (17) for connecting to an external source of transmission.

15. The method according to claim 11, comprising the steps of: connecting the first line termination (LT1) and the second line termination (LT2) to the common port (6); or connecting the first line termination (LT1) and the auxiliary source to the common port (6); or connecting the second line termination (LT2) and the auxiliary source to the common port (6).

16. The method according to claim 15 wherein the auxiliary source is a third line termination (LT3).

17. The method according to claim 11, wherein said first position of said first switching means does not connect said common port to said first line termination.

18. The method according to claim 11, wherein said first position of said second switching means does not connect said common port to said second line termination.

\* \* \* \* \*